United States Patent
Hrinya et al.

(10) Patent No.: US 11,362,579 B2
(45) Date of Patent: Jun. 14, 2022

(54) PEAK VOLTAGE OVERSHOOT CONTROL FOR SWITCH MODE POWER CONVERTERS

(71) Applicant: Apple Inc., Cupertino, CA (US)

(72) Inventors: Stephen Hrinya, San Jose, CA (US); Di Zhao, Santa Clara, CA (US)

(73) Assignee: Apple Inc., Cupertino, CA (US)

(*) Notice: Subject to any disclaimer, the term of this patent is extended or adjusted under 35 U.S.C. 154(b) by 140 days.

(21) Appl. No.: 16/684,312

(22) Filed: Nov. 14, 2019

(65) Prior Publication Data

US 2021/0099073 A1 Apr. 1, 2021

Related U.S. Application Data

(60) Provisional application No. 62/906,834, filed on Sep. 27, 2019.

(51) Int. Cl.
*H02M 1/32* (2007.01)
*H02M 1/08* (2006.01)
*H02M 3/158* (2006.01)

(52) U.S. Cl.
CPC ............ *H02M 1/32* (2013.01); *H02M 1/08* (2013.01); *H02M 3/1588* (2013.01)

(58) Field of Classification Search
CPC .......... H02M 1/32; H02M 1/08; H02M 3/158; H02M 3/1588
See application file for complete search history.

(56) References Cited

U.S. PATENT DOCUMENTS

| 5,568,044 A | * | 10/1996 | Bittner ................ H02M 3/1588 323/224 |
| 10,998,843 B2 | * | 5/2021 | Baeurle ................. H02P 25/32 |
| 2016/0276931 A1 | * | 9/2016 | Trichy ................... H02M 3/158 |
| 2020/0059158 A1 | * | 2/2020 | Toni ........................ H02M 3/07 |
| 2020/0127561 A1 | * | 4/2020 | Takada .................. H02M 3/156 |

FOREIGN PATENT DOCUMENTS

JP 2020065402 A * 4/2020 ............ H02M 3/158

* cited by examiner

*Primary Examiner* — Kyle J Moody
*Assistant Examiner* — Lakaisha Jackson
(74) *Attorney, Agent, or Firm* — Fletcher Yoder PC

(57) ABSTRACT

A switching power converter circuit may include output voltage overshoot mitigation circuitry that can modify operation of the converter responsive to an overvoltage condition by switching from a pulse width modulation (PWM) mode to a pulse frequency modulation (PFM) mode. A clamp may be provided to clamp a control voltage or a compensating capacitor voltage of the main output voltage control loop (e.g., a PWM control loop) to a control voltage of the PFM loop. An output pull down circuit may be provided to temporarily apply a load to the converter output.

9 Claims, 5 Drawing Sheets

… (US 11,362,579 B2)

PEAK VOLTAGE OVERSHOOT CONTROL FOR SWITCH MODE POWER CONVERTERS

BACKGROUND

Modern electronic devices employ a wide variety of switch mode power converters. For example, portable electronic devices, such as laptop and notebook computers, tablet computers, smart phones, and the like, may use a switching power converter (e.g., a buck converter) to convert power delivered from an external power adapter (itself another power converter) into a form suitable for charging the battery. Additional converters and converter topologies may also be used depending on the application.

At a high level, a switching power converter may include one or more switching devices and one or more passive components coupled between an input and an output of the converter. The converter may receive a voltage and current at its input and produce a converted voltage and current at its output. The converter may also include one or more control loops that operate the one or more switching devices responsive to the input and output voltages and currents (or other parameters). For example, a switching converter may include a voltage control loop that operates the switching device(s) to maintain a regulated output voltage.

In some embodiments it may be desirable to minimize the peak output voltage overshoot of such a power converter to protect the powered system from peak voltages originating from the converter. One example loading condition that can result in an output voltage overshoot is a transition from a relatively high load condition to a relatively low load condition. Significant reduction of the load can result in voltage overshoots if the system and/or the control loop are unable to respond with sufficient speed. Depending on the particular circuitry and loading conditions, other conditions may also lead to output voltage overshoots. In some cases, these output voltage overshoots may be reduced by increasing the responsiveness of the control loop, for example by increasing a gain or reducing a time constant of the controller. However, in some applications such changes can lead to complications such as reduced stability. Thus, what is needed in the art is an improved overvoltage mitigation technique for switch mode power converters.

DETAILED DESCRIPTION

Figure 1:
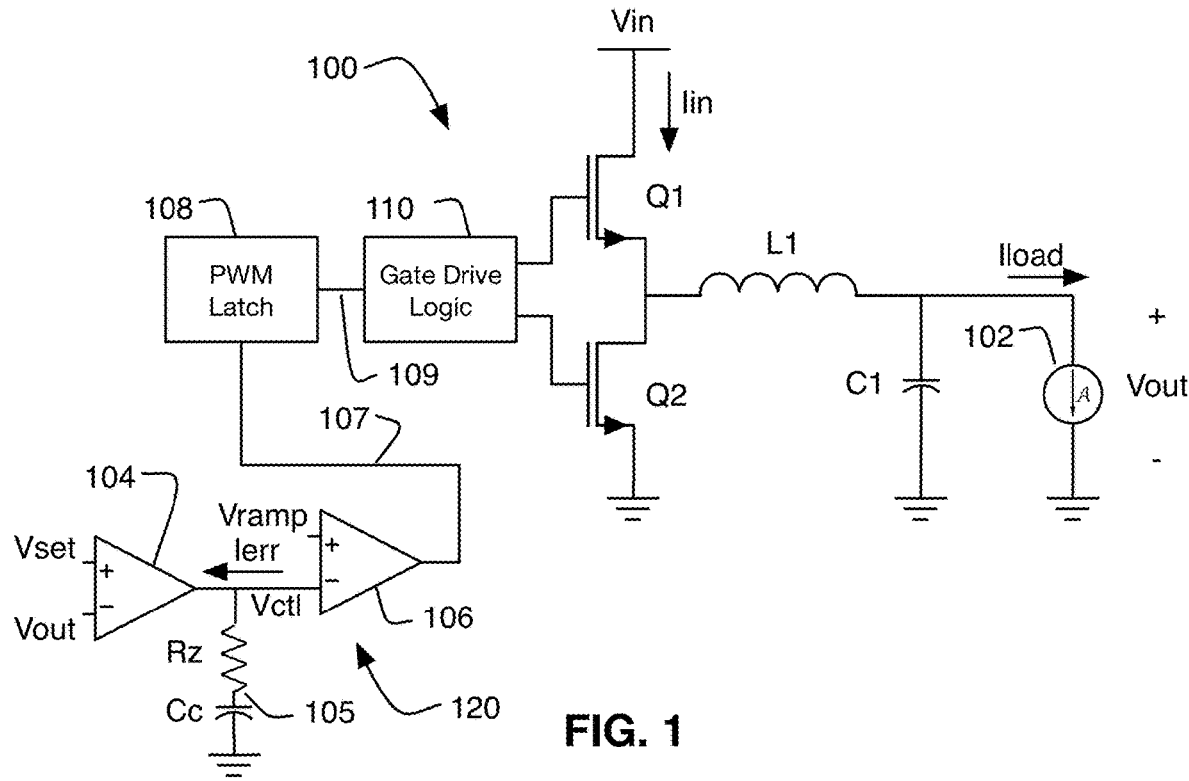
FIG. 1 illustrates a simplified schematic diagram of a buck converter based power converter.

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth in order to provide a thorough understanding of the implementations described herein. In other instances, methods, procedures and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a given drawing, refers to the same element throughout the several drawings, though it may not be repeated in every drawing. The drawings are not to scale unless otherwise indicated, and the proportions of certain parts may be exaggerated to better illustrate details and features of the present disclosure.

FIG. 1 illustrates a simplified schematic diagram of a buck converter based switch mode power converter 100. Throughout this document, the converter circuitry may be referred to as a converter, a buck converter, a switching converter, a switch mode converter, or other similar language as appropriate for the context. Use of various terms is intended to be consistent with usage as would be employed by one ordinarily skilled in the art for the particular context, and should not be construed as limiting unless expressly required. Converter circuit 100 receives an input voltage Vin and an input current Iin and generates an output voltage Vout. Output voltage Vout may be delivered to a load, represented by current source 102, which draws a current Iload.

In the illustrated embodiment, converter 100 is a buck converter, meaning that switches Q1 and Q2 are operated so as to reduce the input voltage Vin to an output voltage Vout that is lower than Vin. More specifically, switch Q1 may be closed to connect the input voltage Vin to the load via inductor L1 and output capacitor C1. When switch Q1 is closed, input current Iin flows through inductor L1 to output capacitor C1 and load 102. This current: (1) delivers energy to load 102, (2) stores energy in inductor L1, and (3) charges output capacitor C1. After a time period determined by the desired output voltage and output current required by load 102, switch Q1 may be opened, disconnecting the input voltage from load 102. Substantially simultaneously, switch Q2 may be closed. Closing switch Q2 allows load current Iload to continue to flow through inductor L1 and load 102. During this time period, energy stored in inductor L1 and capacitor C1 is delivered to load 102.

FIG. 1 also illustrates a simplified schematic of a main output voltage control loop 120 for converter 100. As used herein, "main loop," "main control loop," and similar language will refer to a control loop that regulates output voltage. A particular converter embodiment may include multiple control loops each controlling one of input voltage, output voltage, input current, output current, or other parameters of the converter. In the embodiment of FIG. 1, the main control loop 120 includes an error amplifier 104 that receives at one input (e.g., a non-inverting input) a setpoint voltage Vset, which is the desired output voltage Vout. Error amplifier 104 receives output voltage Vout at the other input (e.g., an inverting input). In some implementations, error amplifier 104 may be implemented as a transconductance amplifier, the output of which is a current (Ierr) proportional to the difference between the output voltage Vout and the set-point voltage Vset.

Providing a loop control signal Vctl for use by pulse width modulation (PWM) comparator 106 may require that the transconductance amplifier output current be delivered to an appropriate impedance. This impedance 105 may be made up of resistor Rz and compensating capacitor Cc. The compensation network 105 comprised of resistor Rz and capacitor Cc may have component values related to the values of inductor L1 and output capacitance C1. More specifically, inductor L1 and capacitor C1 introduce a delay between when a change is made to the switching operation of switches Q1 and Q2 and when the associated change in output voltage Vout appears at the output of the converter. For reasons of control system stability, the values of resistor Rz and compensating capacitor Cc may be selected to provide an impedance that provides a frequency zero corresponding to one of the poles associated with L1/C1. Additionally, the voltage appearing across compensating capacitor Cc may be manipulated as required to facilitate smooth transitions between control loops as described in greater detail below.

Loop control signal Vctl may be provided to one input (e.g., an inverting input) of a PWM comparator 106. PWM comparator 106 may receive at its other input a ramp voltage signal Vramp. Comparator 106 may thus generate an output 107 that is low when error voltage Verr is greater than the instantaneous value of the ramp voltage signal Vramp and high when error voltage Verr is greater than the instantaneous value of ramp voltage signal Vramp. Comparator output signal 107 may be provided to a reset terminal of a PWM latch 108. PWM latch 108 may be set at the beginning of the switching signal and may be reset by PWM comparator 106 (via control voltage 107), thereby determining the timing of switches Q1 and Q2. Gate drive logic 110 may receive PWM latch output signal 109 and generate appropriate gate drive signals for the switches Q1 and Q2. In general, increasing loop control signals will lead to wider turn on pulses for switch Q1, which subsequently deliver more energy from the input voltage source Vin to the load. In multi-phase power converters each switching phase may have its own ramp signal that may be compared against the loop control signal (common to all phases). Each phase may include a separate PWM comparator, PWM latch, gate drive logic, power stage (Q1 and Q2) and inductor.

Gate drive logic 110 may include any necessary interconnecting circuitry to allow PWM latch output signal 109 to drive switches Q1 and Q2. This may include logic circuitry to generate complementary logical gate drive signals for switches Q1 and Q2. This may also include suitable anti-cross conduction logic to prevent both switches from being turned on at the same time (which would short circuit the input). Still further, gate drive logic 110 may also include any circuits necessary to shift the voltage or current of the logical gate drive signals to match the levels required by the particular switching devices used in a given application. As a result, switches Q1 and Q2 will be operated to maintain output voltage Vout at the value determined by the setpoint voltage Vset. As a side note, it will be appreciated that the duty cycle of switch Q1 will be approximately equal to the conversion ratio of the converter, i.e., the ratio of input voltage Vin to output voltage Vout.

The foregoing descriptions with respect to FIG. 1 is based on simplified schematics of a converter circuit and control loop. Detailed circuit configuration, components, and parameters may be selected by an ordinarily skilled artisan to meet the particular requirements of such an embodiment. Additionally, there may be additional functionality, circuit components, or other elements included in a particular embodiment that have not been discussed in detail herein. The foregoing description is thus meant primarily as a background context for discussing the output voltage mitigation techniques discussed below.

The over voltage condition may result from a variety of operating conditions. One contributing factor occurring in some applications is the slow response time of the overall circuitry. For example, with reference to FIG. 1, output capacitance C1 may be relatively large. For example, in portable electronic devices such as smartphones, tablet computers, or laptop computers, a converter like that in FIG. 1 may be used as initial regulation stage between a battery or other power source and all electrical loads in the system. Thus, the output capacitance that the converter sees is the combined capacitance of the entire system. The large output capacitance introduces a large time constant into the control loop. Compensation impedance Rz/Cc in the main control loop may be configured to have similarly large time constant for purposes of control system stability. As a result, whenever load changes occur, it may take a significant time for the main control loop to transition to a new steady state operating condition. For example, when the converter is experiencing a relatively high load, which then decreases significantly (e.g., when a processing element goes into a lower power state, when a display turns off, etc.), the output voltage Vout may overshoot the setpoint level before the circuit can respond.

Figure 2:
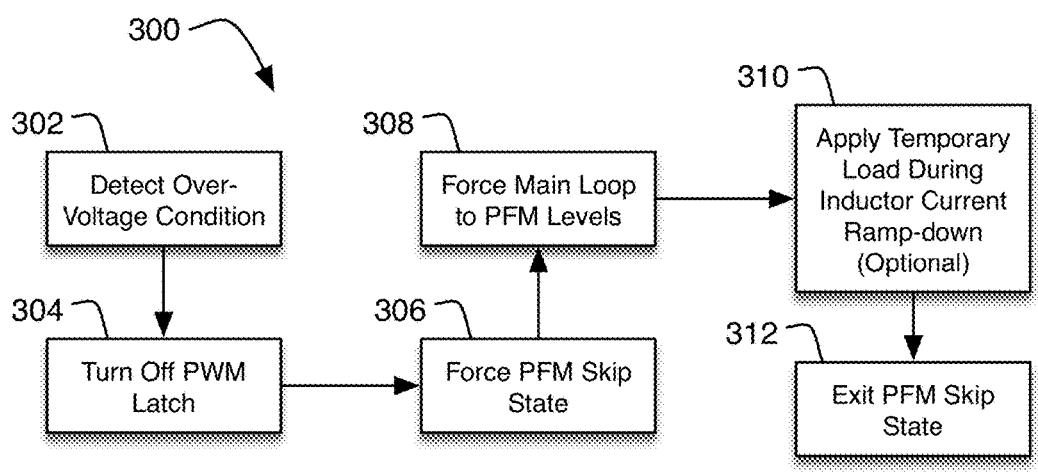
FIG. 2 illustrates a process for mitigating voltage overshoot in a converter.

A process 300 for mitigating voltage overshoot of a converter is illustrated in FIG. 2. Initially, in step 302, the over voltage condition must be detected. As noted above, detecting this overvoltage condition in block 302 is the first step toward mitigation.

Figure 3:
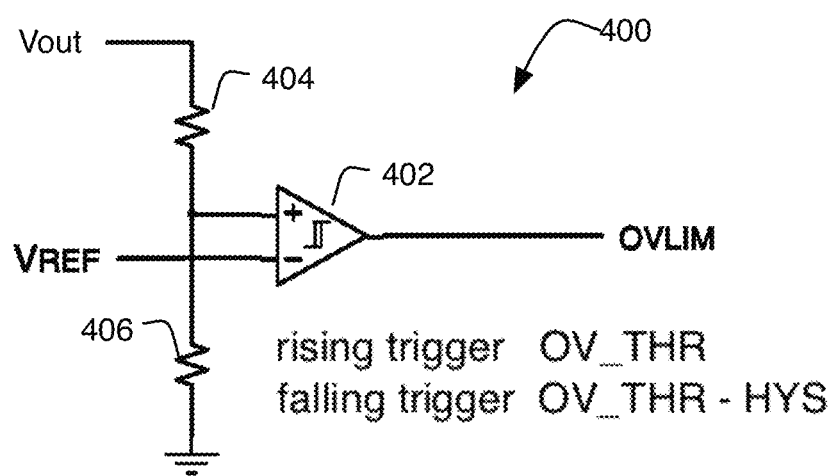
FIG. 3 illustrates an overvoltage detection circuit.

FIG. 3 illustrates one example of an overvoltage detection circuit 400 that may be used with the voltage overshoot mitigation techniques described herein. Overvoltage detection circuit 400 may include a comparator 402 configured to compare the converter output voltage Vout to a reference voltage Vref. Comparator may receive the output voltage via a voltage divider made up of resistors 404 and 406. Comparator 402 may be configured to have a rising over voltage threshold (OV_THR) that is some suitable value slightly above the maximum programmable output regulation target voltage of the converter. Comparator 402 may also be configured with a falling trigger that is some suitable value (OV_THR-HYS) slightly below the rising over voltage threshold. This allows comparator 402 and thus overvoltage detection circuit 400 to have operational hysteresis with respect to the detection of an overvoltage condition. In some embodiments, it may be desirable for the hysteresis band of comparator 402 (i.e., the difference between the rising and falling triggers) to correspond to the PFM (pulse frequency modulation) operating band of the converter (described in greater detail below). Finally, comparator 402 may output an overvoltage limit signal OVUM, indicating that an overvoltage condition has been detected, which may be used by the control circuitry to mitigate the voltage overshoot as described in greater detail below.

Figure 4:
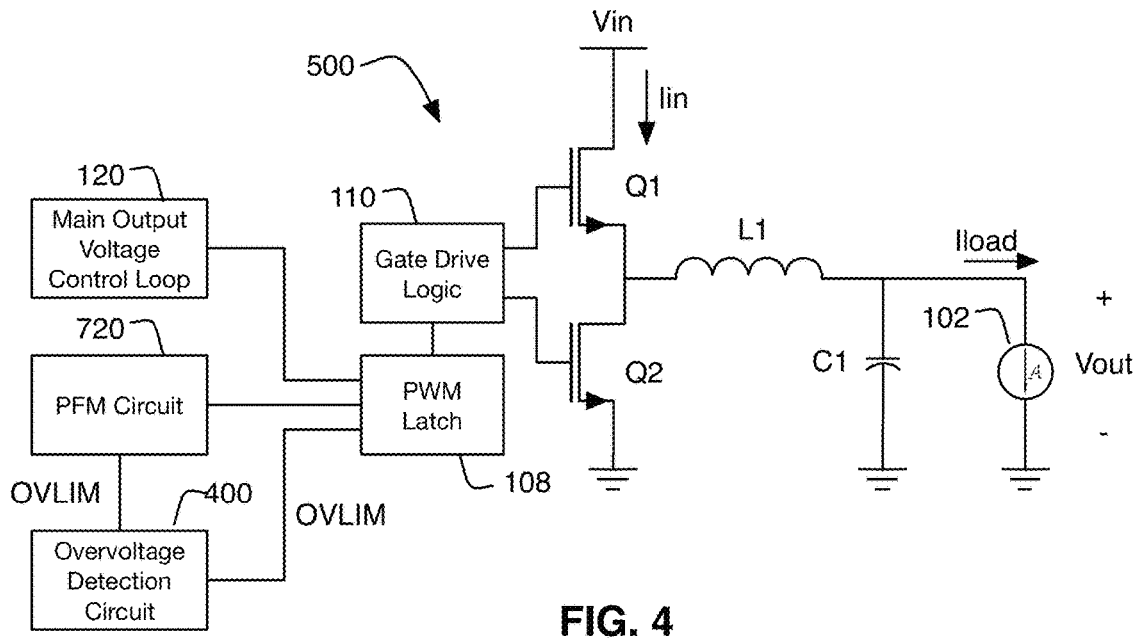
FIG. 4 illustrates a simplified schematic diagram of a switch-mode power converter with a control loop including a PFM controller and an overvoltage detection circuit.

Turning back to FIG. 2, after the overvoltage condition is detected in block 302, a next step of the voltage overshoot mitigation technique can include turning off the PWM latch (block 304). In other words, once the voltage has overshot the setpoint, the PWM latch is cleared, immediately turning off switch Q1. The turn off of Q1 stops the transfer of energy from the input voltage source Vin to the load. After Q1 has turned off switch Q2 is turned on until the inductor current reaches zero, then the switching cycle is terminated (Q1 and Q2 are off). As described above with reference to FIG. 1, PWM latch 108 controls switch timing for switches Q1 and Q2. As illustrated in FIG. 4, by providing the overvoltage limit signal OVUM discussed above with reference to FIG. 3 to PWM latch 108, this overvoltage limit signal may also be used to terminate the switching cycle (immediate turn-off of Q1, turn-off of Q2 after inductor current reaches zero). For multi-phase converters signal OVUM may be used to reset the PWM latch 108 for each respective phase.

With further reference to FIG. 2, after clearing the PWM latch in block 304, overvoltage mitigation technique 300 can further include forcing PFM (pulse frequency modulation) skip state operation in block 306. As is known in the art, PWM (pulse width modulation) operation means that the switching operates at a fixed switching frequency with a varying switch duty-factor that is controlled to regulate the desired parameter. Conversely, in PFM operation the control circuit is configured to deliver inductor current pulses having a fixed, minimum duration at varying timing (frequency). The PFM controller is in the "skip-state" during the interval between the PFM pulses. When operating in PFM mode, the output voltage Vout may be allowed to transit between a high reference value and a low reference value, rather than being tightly regulated to a single setpoint.

There are many ways to implement PFM operation, and various circuits for doing so, but one general technique is as follows: (1) after the external load causes the output voltage to decrease to the low reference value, (2) deliver a sufficient number of minimum pulse width switching pulses that the output voltage is increased to the high reference value, and (3) stop switching (i.e., skip pulses by entering the skip state) until the external load brings the output voltage back to the low reference value. This basic cycle is repeated for so long as the converter remains in PFM mode. The PFM mode is exited when the load current increases to a level where the minimum pulse-width switching is no longer able to regulate the load. In some embodiments, the PFM mode may be implemented by a PFM circuit 720 (FIGS. 4, 5) that may include (among other elements) an additional PFM comparator (722, FIG. 5) that receives as inputs the same output voltage and setpoint as main loop error amplifier 104. PFM circuit 720 may connect to PWM latch 108 to control switching of switches Q1 and Q2. More specifically, the PFM circuit may be configured to disable or blank a switching cycle by clearing the PWM latch. PFM comparator 722 may include a hysteresis value referenced to the input, which can correspond to the minimum and maximum voltages discussed above. In some embodiments, the PFM hysteresis may correspond to the hysteresis of the overvoltage detection circuit.

Figure 5:
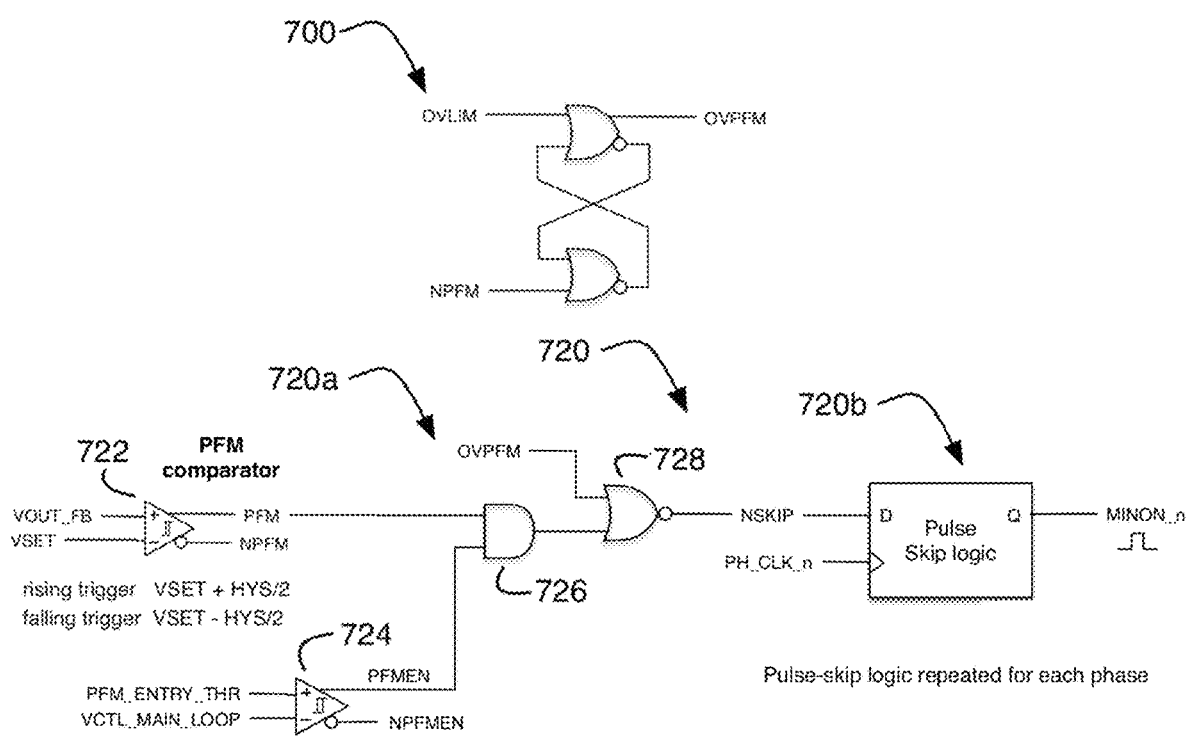
FIG. 5 illustrates an exemplary schematic of control circuitry for triggering PFM operation in response to an overvoltage detected condition.

FIG. 4 illustrates a converter 500 that includes PFM circuit 720 and overvoltage detection circuit 400. Additionally, overvoltage detection circuit output signal OVLIM is coupled to the PFM circuit 720 to trigger PFM skip state operation in response to the overvoltage detection. FIG. 5 illustrates an exemplary schematic of control circuitry for triggering PFM operation in response to an overvoltage detected condition. Illustrated PFM circuitry includes a PFM comparator and logic 720a, pulse-skip logic 720b and overvoltage PFM latch 700. As noted above, PFM control may be implemented using any of a variety of techniques and circuits, so the specific embodiment of FIG. 5 is provided for reference/context and should not be construed as limiting.

Overvoltage PFM latch 700 may generate a signal OVPFM, indicating that PFM mode has been triggered by an overvoltage condition. The OVPFM signal remains active until the latch is reset when Vout falls below the PFM comparator lower threshold. Overvoltage PFM latch 700 can allow an overvoltage condition detected as described above to cause the converter to enter the PFM mode pulse skip state, as described in greater detail below.

PFM control circuitry 720 includes a PFM comparator 722 that may receive at one input (e.g., a non-inverting input) converter output voltage Vout. At another input (e.g., an inverting input), PFM comparator 722 may receive the set-point voltage Vset. PFM comparator 722 may generate an output signal PFM, that becomes low when Vout rises above the upper PFM threshold and remains low until Vout falls below the lower PFM threshold. PFM comparator 722 may also generate signal NPFM which is the logical inverse of signal PFM. Additionally, comparator 724 may receive two inputs, one a PFM Entry Threshold signal and the main control loop error signal VCTL_Main_Loop, which corresponds to the Vctl signal discussed above with reference to FIG. 1, i.e., the main loop control voltage. Comparator 724 thus generates a PFM enable control signal (PFMEN) when the main loop control voltage Vctl is less than an PFM entry threshold. This comparator allows PFM operation only when the main loop control voltage is below the PFM entry threshold. If the PFM signal from PFM comparator 722 and the PFMEN signal from comparator 724 are both high, AND gate 726 will provide a high output that is provided to one input of NOR gate 728. This output is used to enter the PFM skip state during normal PFM operation.

In addition to the output of AND gate 726, NOR gate 728 also receives an OVPFM signal from latch circuit 700. This NOR gate provides an active low signal NSKIP that defines the PFM skip state when either AND gate 726 is high or the OVPFM latch is high. The NSKIP signal may be provided to the D input of flip flop 730, which has a clock input driven by a suitable switching clock signal. When NSKIP is high (inactive) a minimum ON pulse is sent to the PWM latch on each switching cycle. Whenever NSKIP is active (low) the minimum ON pulse is suppressed for that cycle (pulse-skip state).

The net result of the foregoing is that when an overvoltage condition is detected, the converter may be transitioned from an existing PWM mode of operation to a PFM skip operation. More specifically, the converter may enter the PFM mode in the pulse skipping phase of PFM operation, thereby disabling current delivery through switch Q1. Switching remains disabled until the external load reduces the output voltage Vout to cross below the lower PFM threshold (and latch OVPFM is cleared).

To smooth the transition from the PFM blanked/skipped pulse mode back to PWM mode, it may be desirable in some embodiments to force the main voltage loop control voltage (Vctl) to a level corresponding to the operating level in an ordinary light load PFM switching condition. This is illustrated at a high level by block 308 of FIG. 2, with an exemplary schematic circuit for doing so illustrated in FIG. 6. When the PFM pulse skip state is initiated by the overvoltage limit comparator (through latch OVPFM), the main loop control voltage (Vctl) may increase towards its maximum value. Additionally the main loop compensating capacitor Cc may be charged to a voltage corresponding to the operating state just prior to the over-voltage condition. To ensure a smooth transition out of PFM mode, the control voltage (Verr) and/or the voltage across compensating capacitor Cc may be forced to a value near what they would otherwise have in normal low-load PFM operation. This can allow the exit from the overvoltage triggered PFM skip state (illustrated by block 312) to behave in similar fashion to exit from a normal light load triggered PFM mode.

Figure 6:
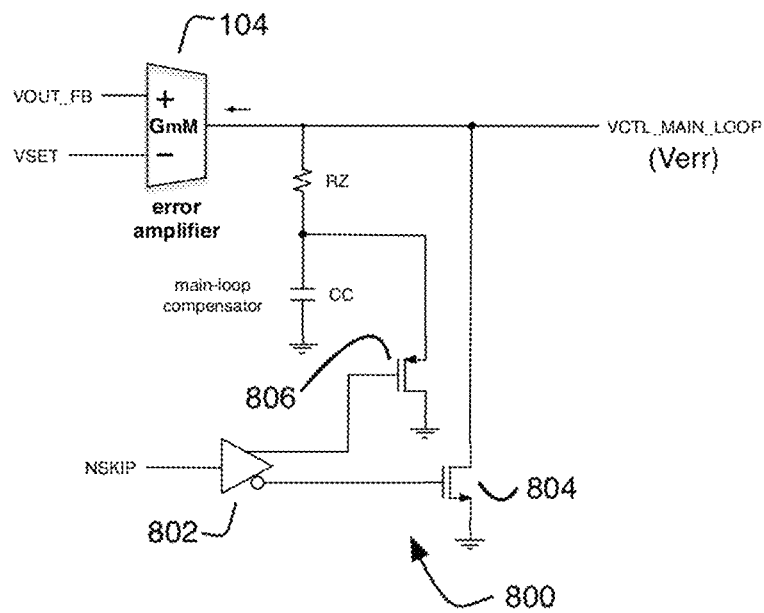
FIG. 6 illustrates an exemplary PFM preload circuit 800 interconnected with the main control loop.

FIG. 6 illustrates an exemplary PFM clamp circuit 800 interconnected with the main control loop. Error amplifier 104 may be the main voltage control loop error amplifier discussed above with reference to FIG. 1. Compensating impedance made up of resistor Rz and compensating capacitor Cc may be coupled to the output of error amplifier 104. The NSKIP signal from PFM control circuit 720 discussed above may be used to trigger field effect transistors (FETs) 804 and 806 to discharge compensating capacitor CC and/or bring down the main loop control voltage Vctl in response to an overvoltage triggered PFM mode. More specifically, switch 806 may be turned on to discharge compensation capacitor Cc., and FET 804 may be turned on to pull down the control voltage that is the output of error amplifier 104.

As a result, both the compensating capacitor voltage and the main loop control voltage may be brought down to a low level, similar to where they would be in a normal light load PFM operating case. In some embodiments only switch 804 may be required, although in cases where compensating capacitor Cc has a large capacitance, switch 806 may be required to keep the stored compensation capacitor Cc voltage from pushing the loop control voltage back up leading to repeated operation of the over-voltage limit circuitry. It should be appreciated that it is not necessary to bring the capacitor and error voltages down to any specific value, just a value that corresponds with normal PFM operating levels in place of the higher level they would otherwise see in an overvoltage triggered PFM transition.

Figure 7:
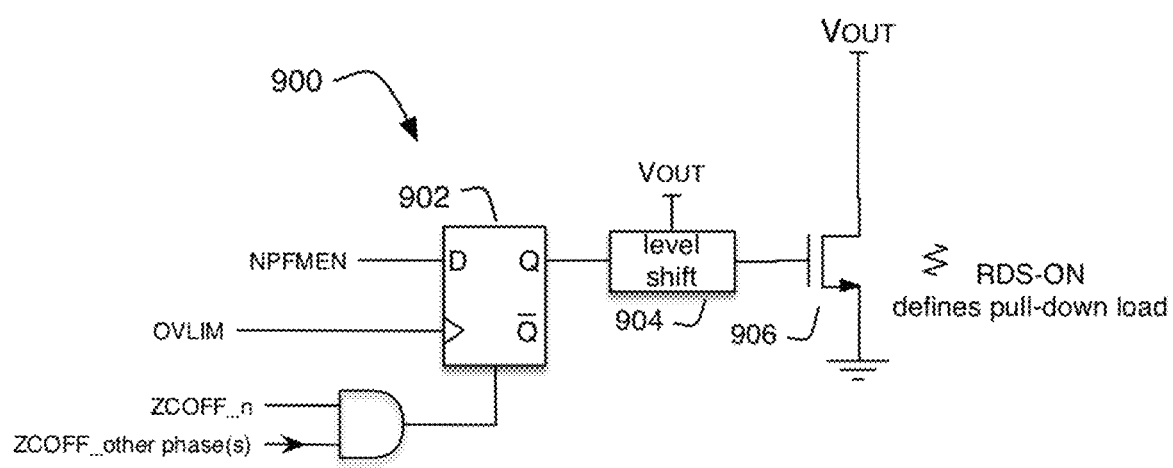
FIG. 7 illustrates an exemplary output voltage pull-down circuit 900.

Turning back to FIG. 2, the overvoltage mitigation method 300 may optionally further include applying a temporary load to the output to further reduce the output voltage overshoot (block 310). FIG. 7 illustrates an exemplary output voltage pull-down circuit 900. In the illustrated pull-down circuit 900, the overvoltage limit comparator output signal OVLIM may be used to trigger a pull down dummy load that partially cancels the output voltage overshoot arising from the inductor current ramp down following the reset of the PWM latch by signal OVLIM. The pull-down circuit is controlled from a flip-flop 902 that is set when the over-voltage limit comparator trips (OVLIM goes high). Flip-flop 902 remains set until the inductor current for all active phases of the converter has ramped to zero. Each phase of the power converter includes current sensing circuitry that reports the current in low-side FET Q2. In normal operation this sensing circuitry is used to detect the zero-cross of the current in Q2 allowing Q2 to turn off whenever the inductor current reaches zero. In this fashion FET Q2 may act as a synchronous rectifier. The reset for latch 902 is provided by the logical AND of the zero-cross detection circuits for all phases of the power converter. Notation for the flipflop reset includes the AND of the ZCOFF (zero-cross low-side FET turn off) signals from all buck phases. It can be ensured that the pull down operates only during the inductor current ramp down interval following the overvoltage limit triggered switching shutdown by activating the pull-down from flip-flop 902 which is set by the over-voltage limit detection and cleared by the inductor zero-cross detection. Additionally, the D input of flip flop 902 may be connected to signal NPFMEN (i.e., PFM mode not enabled) to prevent pull-down activation during normal PFM operation. Otherwise, the OVLIM signal triggers flip flop 902, whose output may be coupled to a level shifter 904, which drives transistor 906.

Transistor circuit 906 may be configured to present any desired impedance applied at the converter output, thereby dissipating energy stored in the inductor without substantially increasing the charge on output capacitor C1 and thereby exacerbating the voltage overshoot. In some embodiments, the transistor 906 may be selected to have an on resistance (RDSON) matching the desired impedance value. In other embodiments, a series resistor may be included with transistor 906. In some embodiments, it may be desired to provide further logic circuitry to prevent or override accidental triggering of the pull-down circuit, that could potentially lead to excessive power loss or possible over-temperature damage. Such circuitry could be used to filter or override false triggers and/or could be a watchdog timer configured to limit the amount of time that transistor 906 may be turned on. In any case, the desired effect of pull-down circuit is to present a dummy load for dissipating energy stored in the inductor when the overvoltage condition is detected so that the corresponding resultant output voltage overshoot is minimized or eliminated.

Figure 8:
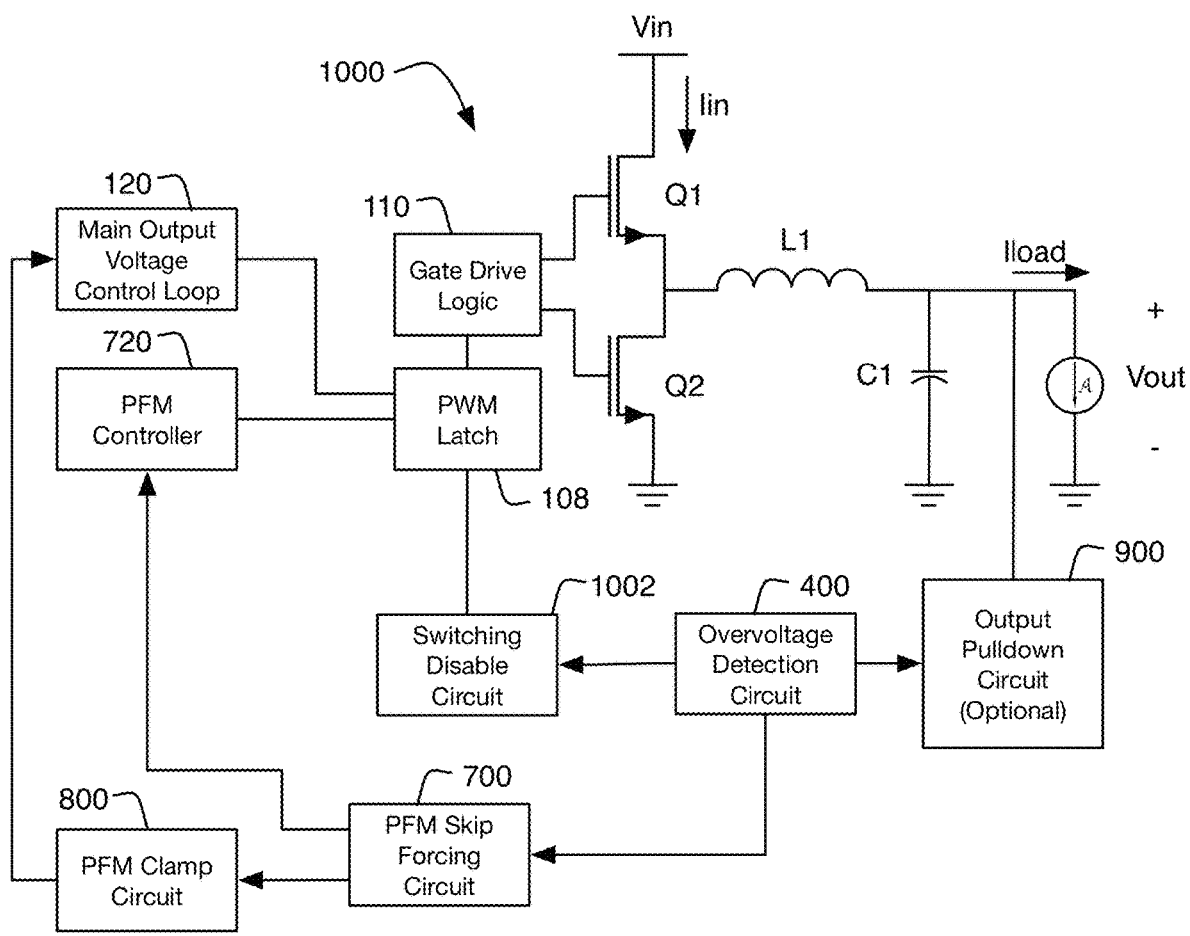
FIG. 8 illustrates a high level schematic/block diagram of a converter including output voltage overshoot mitigation circuitry.

FIG. 8 illustrates a converter 1000 that includes the voltage overshoot mitigation circuitry discussed above. In many respects, FIG. 8 corresponds to FIG. 5 discussed above, and like reference numbers are used. The schematic/block diagram of FIG. 8 further includes overvoltage detection circuit 400. This overvoltage detection circuitry provides an overvoltage signal to switching disable circuit 1002, which resets the PWM latch 108 to disable switching of high side switch Q1. (The switching disabling circuitry may alternatively be incorporated into PWM latch 108). Additionally, the overvoltage signal is provided to PFM skip forcing circuit 700, which forces PFM skip state operation under control of PFM controller circuit 720. PFM clamp circuit 800 may interface between PFM skip forcing circuit 700 and main output voltage control loop 120 to clamp the control voltage and/or the compensating capacitor voltage of the main voltage control loop to values corresponding to a normal (i.e., not overvoltage triggered) PFM mode of operation. Optionally, overvoltage detection circuit 400 may provide an output pull down circuit 900, which may be used to dissipate energy stored in inductor L1 at the detection of an overvoltage condition.

Each of the various circuit blocks discussed above may be constructed according to the simplified schematics described above (with additional elements as required for a particular embodiment or configuration) or may be constructed using any other analog, digital, or hybrid circuitry (including ASICs, microcontrollers, etc.) that accepts appropriate inputs and provides appropriate outputs to implement the functionality described herein. As a result, of these additional components, overshoots of output voltage Vout may be reduced, minimized, or eliminated for some or all operating conditions of a particular embodiment.

Additionally, although the foregoing embodiments have been described in terms of a switching converter that is a single phase buck converter, the teachings herein may be extended to multi-phase switching converters (e.g., a buck converter having multiple switching phases coupled in parallel) or to other switching converter topologies, including, without limitation, boost converters, buck-boost converters, flyback converters, resonant converters, LLC converters, etc. Such converters may be employed in a variety of applications in a variety of portable electronic devices, including AC adapters, battery chargers, processor and/or memory power supplies, LED/LCD display power supplies, and the like. The foregoing overvoltage mitigation techniques may be employed in these and other applications.

Described above are various features and embodiments relating to output voltage overshoot mitigation in switching power converters. Such circuits may be used in a variety of applications but may be particularly advantageous when used in conjunction with circuits having relatively large output capacitance loads. Additionally, although numerous specific features and various embodiments have been described, it is to be understood that, unless otherwise noted as being mutually exclusive, the various features and embodiments may be combined various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

The invention claimed is:

1. A circuit comprising:
 a switching converter including one or more switching devices, the switching converter being configured to receive an input voltage and an input current and deliver an output voltage and an output current;
 a control circuit configured to operate the one or more switching devices, the control circuit including a main control loop configured to regulate the output voltage; and
 an output voltage overshoot mitigation circuit configured to modify operation of the control circuit responsive to an overvoltage condition of the output voltage; wherein:
  the main control loop is configured to generate pulse width modulation timing signals for the one or more switching devices;
  the control circuit further includes pulse frequency modulation circuitry configured to generate pulse frequency modulation timing signals for the one or more switching devices;
  the output voltage overshoot mitigation circuit is configured to disable pulse width modulation switching by the main control loop and trigger the pulse frequency modulation circuitry responsive to the overvoltage condition of the output voltage; and
  the output voltage overshoot mitigation circuit includes an output voltage pull down circuit that temporarily applies a load to the output of the circuit during an inductor current ramp down period.

2. The circuit of claim 1 wherein the pulse frequency modulation circuit includes pulse frequency modulation circuitry and pulse skip logic and wherein the output voltage overshoot mitigation circuit is configured to trigger the pulse frequency modulation control loop in a pulse skip mode.

3. The circuit of claim 1 wherein the output voltage overshoot mitigation circuit includes a clamp configured to clamp at least one voltage of the main control loop to a value associated with a pulse frequency modulation mode of operation.

4. The circuit of claim 3 wherein the at least one clamped voltage includes a control voltage of the main control loop.

5. The circuit of claim 3 wherein the at least one clamped voltage includes a compensating capacitor voltage of the main control loop.

6. The circuit of claim 1 wherein the switching converter is a buck converter.

7. The circuit of claim 1 wherein the switching converter is a multi-phase converter.

8. A control circuit for a switching power converter, the control circuit comprising:
 a main control loop configured to regulate an output voltage of the switching power converter; and
 an output voltage overshoot mitigation circuit configured to modify operation of the control circuit responsive to an overvoltage condition of the output voltage; wherein:
  the main control loop configured to regulate the output voltage generates pulse width modulation timing signals for the one or more switching devices;
  the control circuit further comprises a pulse frequency modulation control loop that generates pulse frequency modulation timing signals for the one or more switching devices; and
  the output voltage overshoot mitigation circuit is configured to disable pulse width modulation switching by the main control loop and to enable the pulse frequency modulation control loop responsive to the overvoltage condition of the output voltage; and
  the output voltage overshoot mitigation circuit includes an output voltage pull down circuit configured to temporarily apply a load to the output of the power converter during an inductor current ramp down period.

9. The control circuit of claim 8 wherein the output voltage overshoot mitigation circuit includes a clamp configured to clamp at least one voltage of the main control loop to a value corresponding to a control voltage of the pulse frequency modulation control loop.

* * * * *